Aug. 18, 1931.     O. J. RUED     1,819,266
VIBRATION ABSORBER
Filed Aug. 19, 1929
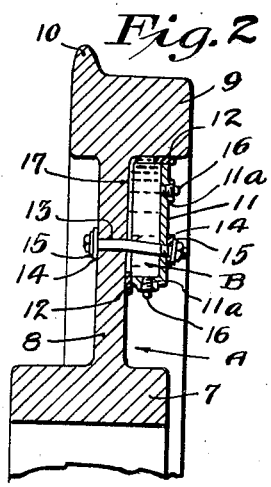
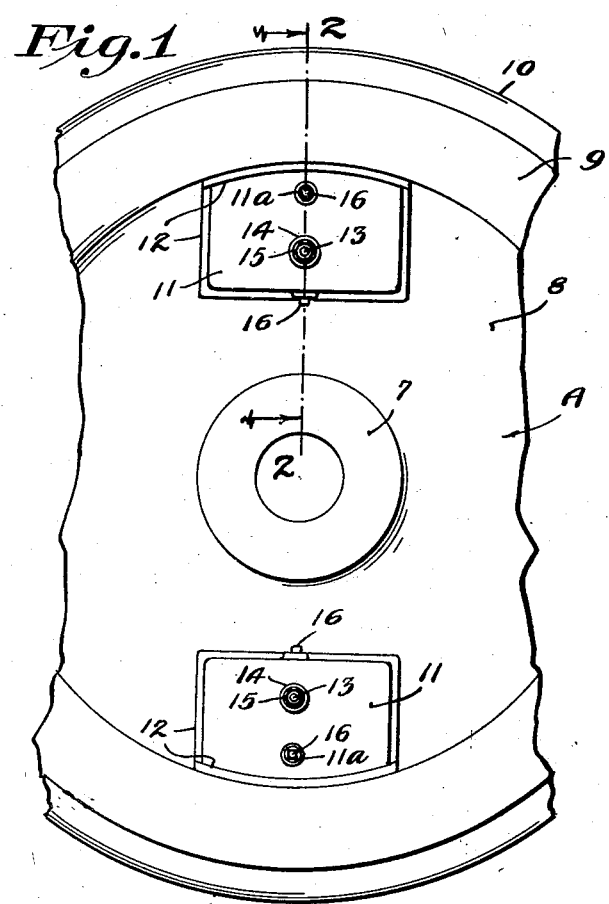
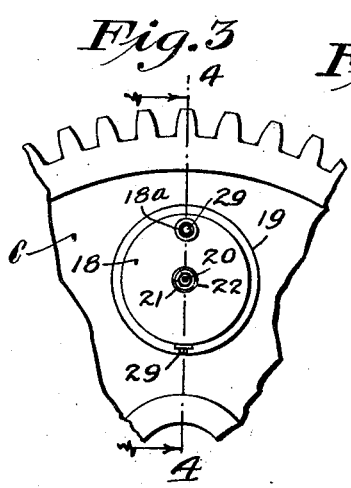
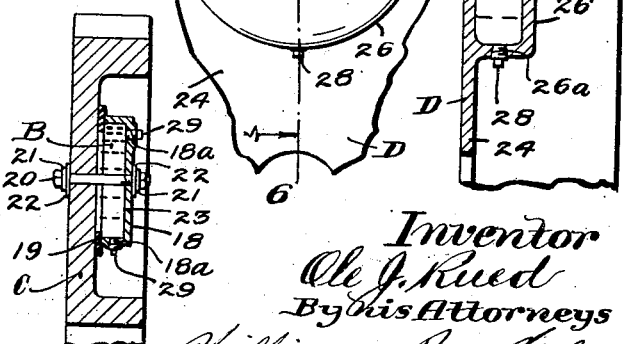
Inventor
Ole J. Rued
By his Attorneys
Williamson, Reig & Williamson Patented Aug. 18, 1931

1,819,266

UNITED STATES PATENT OFFICE

OLE J. RUED, OF MINNEAPOLIS, MINNESOTA

VIBRATION ABSORBER

Application filed August 19, 1929. Serial No. 387,055.

It is the object of this invention to provide a novel and improved construction for use to reduce the vibration of and noises from car wheels, gears, gear casings and other like parts subjected to a pounding action or other actions causing vibration and noise.

To this end, the invention consists in the novel parts and novel combinations of parts, hereinafter defined in the claims and described in the following specification, made in connection with the accompanying drawings, wherein like reference characters refer to the same or similar parts throughout the various views, and, in which, Fig. 1 is a view in side elevation illustrating a portion of a railway car wheel equipped with an embodiment of the present invention;

Fig. 2 is a vertical section taken on the line 2—2 of Fig. 1 as indicated by the arrows;

Fig. 3 is a view illustrating in side elevation a portion of a gear equipped with a second embodiment of the invention;

Fig. 4 is a vertical section taken on the line 4—4 of Fig. 3 as indicated by the arrows;

Fig. 5 is a view illustrating a portion of a brake drum equipped with a third embodiment of the invention, and Fig. 6 is a vertical section taken on the line 6—6 of Fig. 5, as indicated by the arrows.

Referring now particularly to Figs. 1 and 2, portions of a railway car wheel A are illustrated including the hub 7, disk 8, tire 9 and the flange 10 on the tire. Wheels such as the type illustrated, are subjected to a continuous pounding action as they are moved over a track and this pounding action sets up vibrations within the wheel which, in time, tends to crystallize the material forming the wheel and also makes the wheel very noisy when in action. In accordance with my invention, I have shown in Figs. 1 and 2, a construction which will largely eliminate vibration in both the disk 8 and the tire 9 of the wheel A and will make the wheel practically noiseless when in operation. I employ for this purpose a casing 11 open at its inner side and also open at one edge. The casing 11 may be of substantially rectangular shape, as shown, or may be of other shape, if desired, it being merely necessary that the edges of the ends and closed edge of the casing be shaped to conform to the surface of the disk 8 and that the edge of the closed side of the casing be curved to conform to the curvature of the inner side of the tire 9 of the wheel. In the drawings, the edges of the ends and lower edge of the casing are shown as being disposed all in a true plane, to conform to the plane surface of the disk 8, while the open edge of the casing is arcuately curved to conform to the arcuate curvature of the inner side of the tire 9. To permit the casing 11 being seated tightly against both the disk 8 and inner surface of tire 9 of the wheel, a suitable gasket 12 is provided formed preferably from rubber or similar material and this gasket is placed so that a portion of the same bears against the disk 8, while another portion thereof bears against the inner side of the tire 9 in spaced relation from a point where the disk 8 comes in contact with the tire. All edges of the casing 11 are adapted to bear against the gasket 12. To secure the casing 11 to the wheel, a headed and nutted bolt 13 is used which projects through the disk 8 of the wheel and also through the casing 11. Rubber washers 14 or the like bearing against the other sides of disk 8 and casing 11, are placed between iron washers 15 mounted on the two ends of the bolt inwardly from the head and nut thereof, to preclude the possibility of leakage of liquid through the bolt openings in the disk 8 and also in the casing 11. The bolt 13 at its portion projecting from the disk 8 is bent outwardly and slightly toward the hub 7 of the wheel, so that when the nut of the bolt is tightened up, the casing 11 will be moved both towards the disk 8 and towards the inner surface of the tire 9 to tightly clamp all edges of the casing in place against the gasket 12. The casing 11 is preferably provided with two threaded and bossed openings 11a within which plugs 16 are screwed and preferably one of the openings will be provided on the edge of the casing most closely adjacent the hub 7, while the other of the openings 11a will be provided in the side of the casing. When the casing is in applied position on the wheel, the casing together with a portion of the disk 8 and a portion of the tire 9 will form a closed chamber 17. A liquid B will be supplied to this chamber to completely fill the same and although practically any type of liquid can be used, it is preferred to use a non-freezing liquid such as oil, alcohol or some other liquid non-freezing compound. To supply the liquid to the chamber 17, it is necessary only to remove one of the plugs 16 and pour the liquid through one of the openings 11a into the chamber. When it becomes desirable to drain the liquid from the chamber, both plugs 16 may be removed to permit air to enter the chamber as the liquid drains out of the same. Preferably, two or more of the casings will be used on each wheel, as shown in Fig. 1, and these casings will be set either diametrically opposite each other or will be so disposed relative to the center of the wheel that the arc between the casings is the same in order that the wheel may be perfectly counterbalanced. It is found that the liquid B which bears directly against the disk 8 and also directly against the tire 9 will act to eliminate practically all vibration of both the disk and the tire, thereby rendering the wheel practically noiseless. It will, of course be understood that the casing 11 may be applied to a gear, gear casing, or practically any other member subject to vibration to absorb the vibration thereof. The casing is shown applied to the wheel merely for the purposes of illustration.

In Figs. 3 and 4, a slightly different embodiment of the invention is shown. Portions of a gear C are illustrated and a cylindrical casing 18 open on its inner side is shown applied to the gear C, there being a gasket 19 interposed between the edges of the casing and the gear. The casing 18 is secured to the gear C as by means of a straight-nutted and headed bolt 20 running through the gear and through the outer side of the casing, and metal and rubber washers 21 and 22, respectively, are interposed between the head and nut of the bolt and the side of the gear C and the outer side of the casing 18. In the chamber 23 formed by the casing 18 and the gear C, liquid B is placed, there being two bossed openings 18a formed in the casing and closed by plugs 29 to permit the admission of liquid to the chamber and the drainage of the liquid therefrom. The liquid B in the chamber 23 will act against the gear to prevent vibration of the same and deaden the noise that would otherwise be emitted from the same when in operation. It will be understood that the type of casing illustrated in Figs. 3 and 4 may be used on wheels, gear casings or other parts wherever desired, as well as in connection with gears.

In Figs. 5 and 6, another embodiment of the invention is shown and illustrated as being used in connection with a brake drum D, including a disk 24 and a flange 25 forming a braking surface. A casing 26 is molded integral with the disk 24 and flange 25 of the drum to form a chamber 27 closed by the casing 26, the disk 24 and the flange 25. Threaded openings 27a are provided on the two side surfaces of the casing 26 within which plugs 28 are screwed and liquid B is inserted within the chamber 27 to completely fill the same. When in use, the liquid B will act to prevent the vibration of both the disk 24 and flange 25 of the drum and thereby prevent noises being emitted by the drum when in use. It will be understood that, if desired, a liquid chamber can be formed on any part such as a wheel, gear, or gear casing subjectable to vibration to absorb the vibration from the same.

As was stated, it is preferred to use a liquid B in the various casings composed from oil, alcohol or some other non-freezing compound in order that the part having the casing applied thereto may be subjected to all weather conditions without causing the liquid to freeze. In some situations, the liquid would not be exposed to low temperatures and, accordingly, water could be used if desired. In the embodiment shown in Figs. 1 and 2, and in Figs. 5 and 6, the liquid situated in one casing alone, will act to absorb the vibration from two surfaces set at an angle to each other, and it is, accordingly, preferred to use one of these forms of construction when the vibration in flanged or angular members is to be absorbed.

The present vibration absorber is very simple in construction and in application.

It will, of course, be understood that various changes may be made in the form, details, arrangement and proportions of the various parts without departing from the scope of the present invention.

What is claimed is:—

1. In a member subjectable to vibration and having two angular portions joining each other, a removable casing having an open inner side and an open edge, a gasket fitting against both of said portions, said casing being applied to bear against said gasket, means for simultaneously tightening said casing against all portions of said gasket to form with said two angular portions a liquid tight chamber and liquid filling said chamber to absorb the vibration of both of said portions.

2. In a member subjectable to vibration and having a flat portion and a circular portion set at an angle thereto, a device for absorbing the vibration of both said flat portion and said circular portion comprising, a casing open at one side and also open at one edge, the open edge of said casing being curved to fit against said circular portion and the open side of said casing being shaped to fit against said flat portion, means for holding said casing in liquid tight engagement with both said flat portion and said circular portion to form therewith a closed chamber and liquid filling said chamber.

3. In a member subjectable to vibration and having two angular portions joining each other, a removable casing having an open inner side and an open edge, said casing being applied so that its open side bears against one of said angular portions of said member and its open edge bears against the other angular portion of said member, means for simultaneously tightening said casing against both portions of said member to form therewith a fluid tight chamber and flowable material filling said chamber to absorb the vibration of both said portions.

In testimony whereof I affix my signature.

OLE J. RUED.